(12) United States Patent
Feustel et al.

(10) Patent No.: US 11,676,745 B2
(45) Date of Patent: Jun. 13, 2023

(54) PTC HEATING ELEMENT AND AN ELECTRIC HEATING DEVICE

(71) Applicant: Eberspächer catem Hermsdorf GmbH & Co. KG, Hermsdorf (DE)

(72) Inventors: Jan-Michael Feustel, Bodelwitz (DE); Florian Bitto-Golon, Remse (DE); Ahmad Asafi, Karlsruhe (DE); Stefan Plewnia, Karlsruhe (DE); Kai-Fabian Bürkle, Hinterweidenthal (DE); Michael Niederer, Kapellen-Drusweiler (DE); Marcel Lösch, Essingen (DE)

(73) Assignee: Eberspächer catem Hermsdorf GmbH & Co. KG, Hermsdorf (DE)

( * ) Notice: Subject to any disclaimer, the term of this patent is extended or adjusted under 35 U.S.C. 154(b) by 544 days.

(21) Appl. No.: 16/808,850

(22) Filed: Mar. 4, 2020

(65) Prior Publication Data
US 2020/0286653 A1 Sep. 10, 2020

(30) Foreign Application Priority Data

Mar. 6, 2019 (DE) .......................... 102019203066.1
Apr. 2, 2019 (DE) .......................... 102019204665.7

(51) Int. Cl.
*H05B 3/06* (2006.01)
*H05B 3/14* (2006.01)
(Continued)

(52) U.S. Cl.
CPC .............. *H01C 7/021* (2013.01); *H01C 1/08* (2013.01); *H05B 3/06* (2013.01); *H05B 3/141* (2013.01);
(Continued)

(58) Field of Classification Search
None
See application file for complete search history.

(56) References Cited

U.S. PATENT DOCUMENTS

| 4,324,974 A | 4/1982 | Steiner et al. |
| 6,392,209 B1 | 5/2002 | Oppitz |
| (Continued) | | |

FOREIGN PATENT DOCUMENTS

| DE | 102004045668 | 6/2005 |
| DE | 102017209990 | 12/2018 |
| (Continued) | | |

*Primary Examiner* — Joseph M. Pelham
(74) *Attorney, Agent, or Firm* — Boyle Fredrickson S.C.

(57) ABSTRACT

A PTC heating element has two insulating layers with a metallic coating provided on one side and a PTC element arranged therebetween. The PTC element is provided on oppositely disposed main side surfaces with a respective metallization which is electrically conductively connected to the coating of one of the insulating layers The metallization provided on one of the main side surfaces is assigned only to one potential for energizing the PTC element, and the metallization provided on the other of the main side surfaces is only assigned to the other potential for energizing the PTC element, as well as an electric heating device containing such a PTC heating element. With regard to better heat decoupling, the insulating layer may be glued to the PTC element, and the coating of the insulating layers is in direct electrically conductive contact with the metallization of the PTC element.

15 Claims, 2 Drawing Sheets

(51) Int. Cl.
*H05B 3/24* (2006.01)
*H05B 3/30* (2006.01)
*H01C 7/02* (2006.01)
*H01C 1/08* (2006.01)

(52) U.S. Cl.
CPC ......... *H05B 3/24* (2013.01); *H01M 2200/106* (2013.01); *H05B 2203/02* (2013.01)

(56) References Cited

U.S. PATENT DOCUMENTS

2014/0169776 A1\* 6/2014 Kohl .................... F24H 9/1872
  392/485
2016/0360573 A1\* 12/2016 Bohlender ............... H05B 3/18
2017/0370614 A1\* 12/2017 Liu ...................... F24H 9/0015

FOREIGN PATENT DOCUMENTS

| EP | 0026457 | 4/1981 | |
|---|---|---|---|
| EP | 2109347 A1 \* | 10/2009 | ............... H05B 3/06 |
| EP | 3334244 | 6/2018 | |
| GB | 2320614 | 6/1998 | |

\* cited by examiner

PTC HEATING ELEMENT AND AN ELECTRIC HEATING DEVICE

BACKGROUND OF THE INVENTION

1. Field of the Invention

The present invention relates to a PTC heating element and an electric heating device with such a PTC heating element.

The present invention relates in particular to a PTC heating element having two insulating layers with a metallic coating provided on one side and a PTC element arranged therebetween which is provided on oppositely disposed main side surfaces with a respective metallization which is electrically conductively connected to said coating of one of the insulating layers. The invention more particularly relates to a PTC heating element in which the metallization on one of the main side surfaces is assigned only to one potential for energizing said PTC element, and the metallization provided on the other of the main side surfaces is only assigned to the other potential for energizing said PTC element.

2. Background of the Invention

A PTC heating element of the generally type described herein is known from EP 0 026 457 A2. The PTC heating element known from this prior art has a plastic frame which is injection-molded and has aluminum oxide plates attached on opposite main sides of the PTC heating element. The plates are provided with a layer of ductile solder, which is in electrically conductive contact with PTC elements, which is provided inside the frame, and which is provided with a metallization on the main side surfaces disposed opposite the aluminum oxide plates. In the prior art, electrical connecting tracks protrude through the frame and are soldered to the ductile solder of the aluminum oxide plate. The end-to-end metallizations provided on the two main side surfaces of the PTC element are each assigned different polarities. The power current must then penetrate the PTC element in the thickness direction in order to heat it.

The aforementioned prior art leaves room for improvement. The present invention intends, in particular, to provide an improved PTC heating element for use in motor vehicles with improved heat decoupling. PTC heating elements of the type mentioned above are used in motor vehicles, for example, to heat liquid, to heat equipment, or the interior of the vehicle, or to have air entering the passenger compartment flow thereonto as a corrugated rib heater. Such auxiliary heaters are typically disposed downstream of a vehicle's heat exchanger and do not comprise tubes bearing coolant. Contact is established by contact elements of different polarity which are typically supported in the frame in an insulating manner. The electrically conductive tracks leading to the PTC element are also supported in a manner electrically insulated from each other in a frame that is regularly made of plastic material. These design features generally known from prior art are also preferred further developments of the electric heating device according to the invention.

SUMMARY

To solve this problem, a metallization is provided on one of the main side surfaces of the PTC element and is assigned only to one potential for energizing the PTC element, whereas the other potential is applied to the other main side surface and the metallization provided there. To heat the PTC element by way of a power current, it is then necessary that the power current flows in the thickness direction through the PTC element. The main side surfaces are typically understood to be the largest surface of the PTC element. The PTC elements can be round. In this case, the circular surfaces, usually provided plane-parallel to each other, are the main side surfaces, but not the circumferential surfaces. However, the PTC element may have the shape of a cuboid. Two oppositely disposed plane-parallel main side surfaces are typically connected with an edge extending circumferentially in the circumferential direction. The edge surfaces disposed perpendicular to each other have the same thickness, i.e. height extension. This extension is commonly considerably smaller, typically by a factor of 5 or more than the smallest dimension (width or length) of the main side surfaces.

Energization of the PTC heating element may be effected via the coating provided on the insulating layer. The Insulating layer can be a plastic film or a ceramic layer. The insulating layer can also be formed as a hybrid insulating layer formed from several insulating layers, for example, from a combination of at least one ceramic plate with at least one film. The ceramic plate there usually comprises the coating.

Contacting of the metallization on the PTC element may be effected via the coating of the insulating layer. The insulating layer metallized with the coating is glued onto the PTC element. The two are thus bonded by gluing to become a unit forming a heating cell. The insulating layer typically has a full surface coating provided on the inner side thereof. The coating or metallization, respectively, on the PTC element are applied by way of screen printing or sputtering. Disposed directly beneath the metallization is the semiconducting material of the PTC. In the present invention, heat dissipation is effected directly from the PTC into the metallization applied thereonto and from there into the insulating layer and its coating. The insulating layer forms the external surface of the PTC heating element that dissipates the heat to the exterior.

Although there is adhesive present between the coating and the metallization, the electrical contact between the coating and the metallization, however, is effected by direct electrically conductive contact between the coating and the metallization. The coating and the metallization typically have certain roughness peaks which bear against each other, partially interlocking with each other. These points of contact are typically used for electrical contact between the coating and the metallization. The adhesive is used in such a way that all pin holes and voids between the PTC element and the metallization provided thereon and the insulating layer and the coating provided thereon are filled by the adhesive to the extent possible, but that the coating and metallization at the same time directly touch each other.

With regard to good electrical contact and to increase the roughness peaks, the PTC element may be roughened in the region of the metallization.

A PTC element is thus created which can exhibit a small layer thickness between the PTC element and the outer surface of the insulating layer, which promotes heat dissipation from the PTC element.

The adhesive can have good heat conduction. As the roughness peaks, firstly, of the coating, and, secondly, of the metallization directly contact, such an adhesive can fill remaining voids within the roughness peaks, whereby heat conduction between the PTC element and the insulating layer also improves in the region of metallization and the coating. To increase thermal conductivity of the adhesive, the latter may comprise filler material in the form of heat-conductive particles that conducts heat well. The grain size of the particles is to be selected such that contact of the roughness peaks of the metallization with the coating is not bridged or impaired by the particles. The particles are regularly very small, no more than between 2 and 5 µm, depending on the dimension of the roughness peaks. The particles should not be greater than 20 µm at most, and more typically not greater than 10 µm. In particular ceramic particles which have a thermal conductivity of between 20 and 30 W/(m K) are suitable as particles that conduct heat well. These thermally conductive particles are, for example, introduced into silicone adhesive. Its thermal conductivity (by itself or as a suspension with the particles) should be at least 3 W/(m K). The adhesive can be electrically conductive or electrically insulating.

According to a further development of the present invention, the insulating layer may form a contact lug which projects over the PTC element. Each of the two insulating layers forms corresponding contact lugs. The insulating layers may be formed to be identical, so that same parts can be used for the manufacture of the heating cell.

The contact lug can be extended on the edge side over a frame and realize the outer connection of the PTC heating element to a power current. The frame typically seals the insulating layers at least on the edge side such that the medium to be heated cannot reach the current-carrying parts of the heating cell within the frame. The frame may bey made of silicone and may be attached to the heating cell by injection mold coating. In this case, the contact lug formed by the insulating layer is usually passed through a frame segment which is integrated into the frame during injection mold coating. The frame segment accordingly forms a seal on a face side of the heating cell that is projected by the contact lugs.

According to one alternative configuration, electrical contacting of the PTC element on the outer side of the frame is effected by contact lug elements which are electrically connected to the associated coatings of the insulating layers. These contact lug elements project over the frame at the end side. They may be formed by punch-processed sheet metal pieces and may, in a preloaded manner, bear against the assigned insulating layer and the coating provided thereon. Though the connector lugs can be connected, in particular soldered, to the coating of the insulating layer, in a preloaded manner, however, without a respective direct connection between the connector lug element and the associated insulating layer or coating is preferable. Where the following description dealing with the connector lug elements contacting the coating of the insulating layer, gears toward the insulating layer as such, then this is based on the assumption that only the insulating layer in the form of, for example, a ceramic layer is suitable to create an abutment for the separate connector lug element and that the coating is sufficiently stable only for applying the insulating layer.

For pre-positioning and sealing when injection mold coating the frame, a frame segment may be provided which forms holding channels for the connector lug elements and is pushed onto the insulating layers. By pushing it onto the insulating layers, the frame segment is positioned relative to the heating cell. The frame segment is typically provided with the connector lug elements before being pushed onto the heating cell. The frame segment may comprise a ventilation opening through which air can be displaced from the inside of the heating cell or frame when injection mold coating the frame until the cavity is volumetrically filled and all the spaces in the heating cell are filled with the plastic material injected. As a result, the frame segment is connected to the frame by injection mold coating and sealed therein. The connector lug element may be held in the frame segment in a positive-fit manner. For this purpose, the connector lug element formed by punching sheet metal typically has a catch projection that is formed by punching and bending out the sheet metal plane and that interacts with a catch opening of the frame segment.

With regard to a sound electrical contact, which is also not impaired by the plastic material injected for the formation of the frame which is commonly silicone, the connector lug element can be formed with a contact projection and an abutment provided adjacent thereto. The contact projection directly bears against the coating of the insulating layer in an electrically conductive manner. For this purpose, the contact projection can be provided with a certain roughness or applied contact peaks which allow for punctiform contact of the insulating layer to the coating. The abutment bears against at the oppositely disposed insulating layer and accordingly pushes the contact projection against the insulating layer assigned to it. Supporting the abutment at the oppositely disposed insulating layer may be effected by interposing an bearing ridge made of insulating material. The bearing ridge may be formed by the frame segment which is extended between the insulating layers in a direction substantially parallel to the longitudinal extension of the connector lug element. The connector lug element is then supported at the oppositely disposed insulating layer, but is electrically insulated by the insulating bearing ridge against the polarity of the oppositely disposed insulating layer.

While the connection was previously described as a connection provided by the insulating layer to which contact lugs are connected, where these contact lugs are metallic contact lugs, the insulating layer according to one alternative configuration can also itself form the corresponding contact lug. For this purpose, the insulating layer is extended beyond the outer circumference of the insulating material typically circumferentially encompassing the two insulating layers and the PTC element. Only the relatively short narrow segment protruding from a base surface of the insulating layer there forms a contact lug which projects over the PTC element on the edge side, where the edge is formed by insulating material, for example, in the form of an insulating bead of adhesive, which seals the PTC element circumferentially and can form a frame within the meaning of the invention.

According to another aspect of the invention an electric heating device, in particular for a motor vehicle, is provided with several PTC heating elements of the type discussed above. The outer surface of the insulating layer facing away from the PTC element forms an exposed surface for transferring heat to the medium to be heated. This outer surface is exposed in the housing. The outer surface and also the sealing strip circumferentially sealing the PTC element and the insulating layers can be formed according to EP 3 334 244 A1 and/or be inserted into the electric heating device and electrically connected in the manner described therein. Alternatively, the outer surface of the insulating layer can also be at least in part in heat-conductive contact with a radiator against which the medium to be heated flows. Such a configuration may be used for an air heater. The heat emitted by the PTC element is then transferred through the insulating layer in a heat-conducting manner to individual heating ribs of the radiator element. Convective dissipation of the heat generated takes place there via the radiator element. While heat transfer in the configuration of the first case takes place directly from the outer surface of the insulating layer to the medium to be heated, heat dissipation in the configuration of the second case takes place largely between the surface of the radiator element and the medium to be heated, typically a gas, such as air.

The electric heating device can be a heating device operated with high voltage. In this case, the current-carrying elements of the electric heating device are sealed and insulated against the medium. Sealing is typically effected by the frame and the insulating layers. The contact lugs extended therebeyond are in turn extended in a sealed manner into a connection chamber in which the each individual PTC element is electrically connected to a controller and/or power supply. This connection chamber is typically part of the electric heating device and can comprise control components with which the PTC elements of the electric heating device are actuated. The connection chamber commonly accommodates at least one printed circuit board for the electrical connection of the various contact lugs. The printed circuit board can also merely group the various contact lugs of the PTC elements into one or more heating circuits made up of different PTC heating elements. The connection chamber is typically separated from the circulation chamber by a partition wall. The partition wall may have a female plug-in receptacle for each PTC heating element into which the PTC heating element is inserted in a fluid-tight manner. For this purpose, the frame typically forms a sealing structure which is usually provided at the height of the frame segment and with which the frame segment usually formed from a resin component is given internal support.

BRIEF DESCRIPTION OF THE DRAWINGS

Further details and advantages of the present invention shall become apparent from the following description in combination with the drawing, in which.

DETAILED DESCRIPTION

Figure 1:
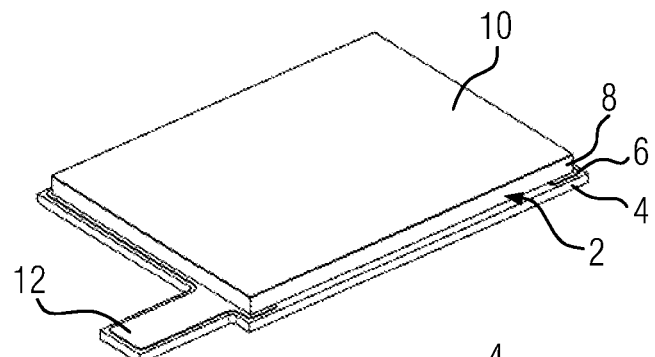
FIG. 1 shows a perspective side view of components of a first embodiment of a PTC heating element.

The PTC heating element marked in the figures with reference numeral 2 comprises a lower insulating layer 4 which is provided with a coating 6 onto which a PTC element 8 is glued. The PTC element 8 comprises a metallization 10 which is provided over the entire surface on the oppositely disposed main side surfaces of the PTC element 8. This metallization 10 is directly electrically conductively connected to the coating 6 of the insulating layer 4. For this purpose, roughness peaks of coating 6 and metallization 10 contact each other.

As can be seen, the insulating layer 4 forms a contact lug 12 which projects over the PTC element 8. The contact lug 12 of the first embodiment is formed as a lug and can accordingly be used as a female contact element of a plug connection. For this purpose, the contact lug 12 is provided with a rectangular cross-section and has a cylindrical shape. The contact lug 12 is formed from the material of the insulating layer 4 and comprises the electrically conductive coating 6 on its surface facing inwardly.

Figure 2:
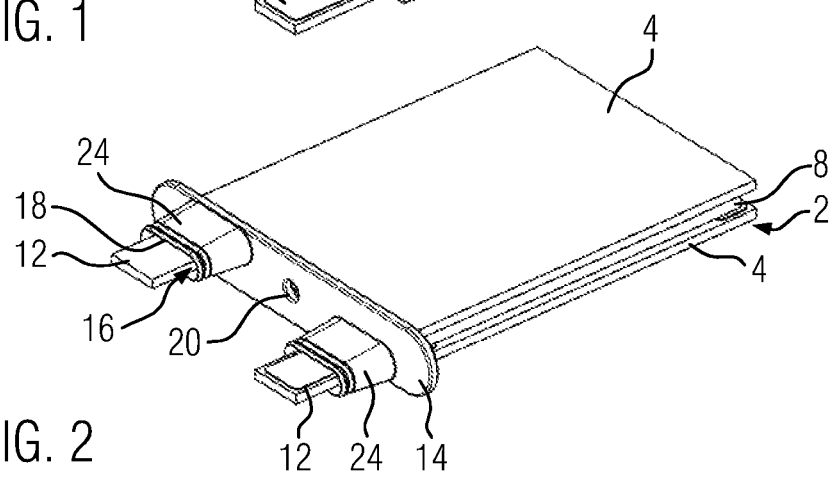
FIG. 2 shows a view according to FIG. 1 after the further insulating layer has been applied.

A further insulating layer 4 is applied to the PTC element 8 in FIG. 2. The further insulating layer 4 is formed like the lower insulating layer 4. Both insulating layers are formed identically. The contact lugs 12 are in the width direction disposed at opposite edges of the PTC heating element and in the thickness direction separated from each other by the thickness of the PTC element with the metallization of the PTC element 8 with the insulations 10 on both surfaces and the coatings 6.

FIG. 2 further illustrates a frame segment 14 which forms holding channels 16 for the contact lugs 12. The contact lugs 12 are provided in a manner sealed against the holding channel. For this purpose, a separate sealing element 18 can be introduced together with the contact lugs into the respective holding channel 16. The frame segment 14 further comprises a degassing opening 20 through which air can escape from the interior of the frame to be produced and therefore from the injection mold when the heating cell formed by the PTC element 8 and the two insulating layers 4 is injection mold coated. During injection molding, the frame segment 14 seals the injection mold in the direction of the contact lugs 12 and their free ends.

Figure 3:
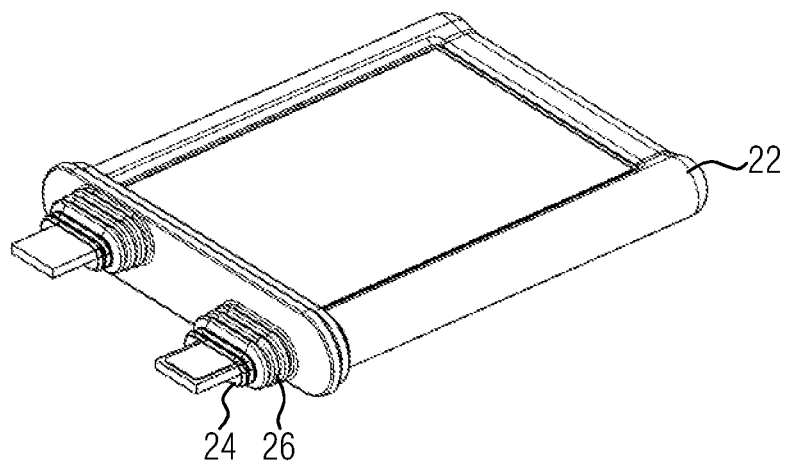
FIG. 3 shows a view according to FIGS. 1 and 2 after completion of the frame.

The frame produced by injection mold coating is shown in FIG. 3 and marked with reference numeral 22. The frame 22 presently comprises labyrinth seals 26 that surround the nozzles 24 of the frame segment 14 and that define the holding channels 16, and that are inserted into passage openings of a partition wall of an electric heating device in a sealing manner to separate a circulation chamber, in which the PTC heating element is substantially exposed, from a connection chamber, in which the free ends of the contact lugs 12 are exposed for the electrical connection. This forms a fluid-tight seal directly through the frame 22.

Figure 6:
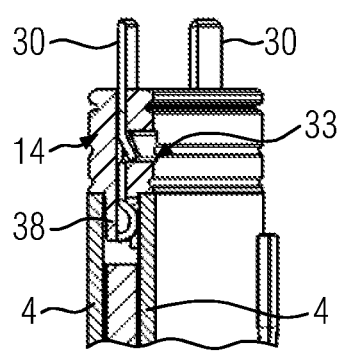
FIG. 6 shows a longitudinal sectional view of the upper part of the embodiment according to FIG. 4
Figure 7:
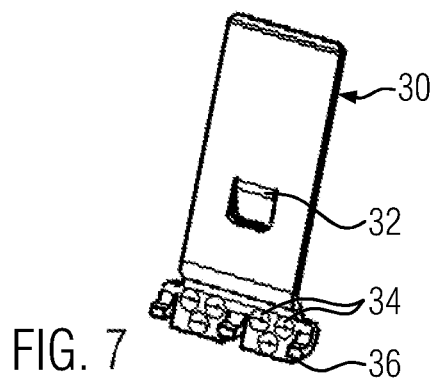
FIG. 7 shows a connector lug element of the second embodiment according to FIGS. 4 and 6.
Figure 4:
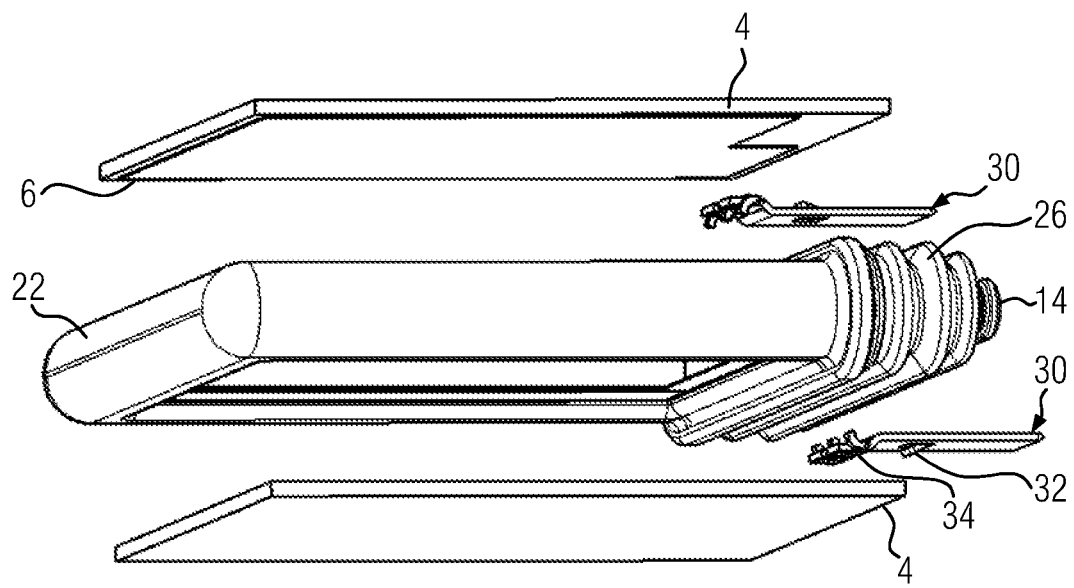
FIG. 4 shows a perspective side view of a second embodiment in exploded representation.
Figure 5:
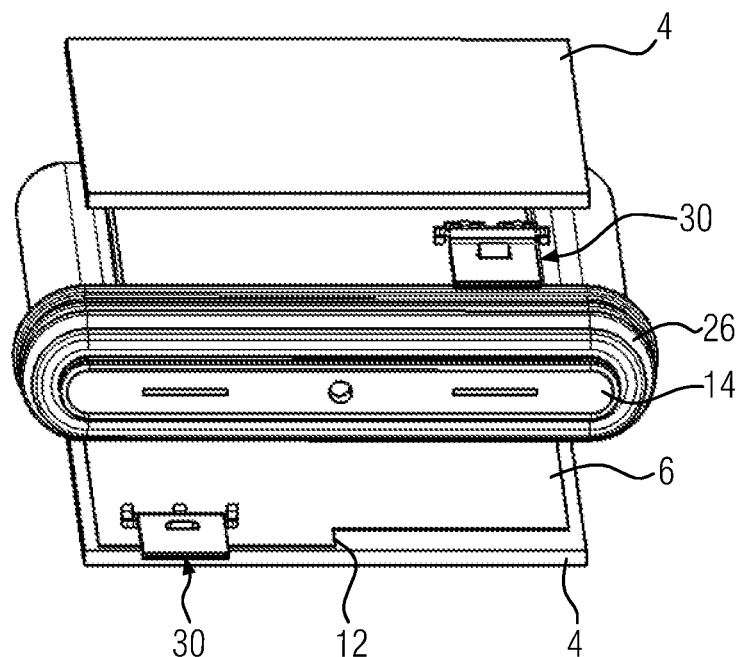
FIG. 5 shows a perspective face side view of the second embodiment.

FIG. 4 together with FIGS. 5 to 7 shows an alternative embodiment. Same components are marked with the same reference numerals as in the embodiment previously described.

FIG. 4 shows only the insulating layers together with the frame 22 as essential parts of the PTC heating element 2. The PTC element is arranged within frame 22. Like in the first embodiment, the insulating layers 4 are made of ceramic plates, in particular aluminum oxide plates, provided with the coating 6. However, the insulating layers 4 of the second embodiment have no contact lugs formed by the insulating layers. Separate connector lug elements 30 are instead provided and formed by punching out and bending sheet metal material. The connector lug elements 30 have an end section which is formed by the original sheet metal without deformation and a female connector lug for a plug connection within the connection chamber. Protruding from this straight section is a catch projection 32 which is formed from the sheet metal material by punching out and bending and—as shown in FIG. 6—engages in a catch opening 33 of the frame segment 14 in order to connect the connector lug element 30 to the frame segment 14.

As show in FIG. 5, the coating 6 is extended for the formation of a contact lug 12, which remains within the frame 22, beyond the base surface of the PTC element 8. Though this contact lug 12 is slightly wider than the associated connector lug element 30, it is significantly narrower than the insulating layer 4. The connector lug element 30 abuts in an electrically conductive manner against this contact lug 12.

As illustrated in FIGS. 6 and 7, the connector lug element has a contact projection 34 that protrudes from the sheet metal plane in a U-shaped manner in the direction toward the associated insulating layer 4 and that bears in punctiform or linear manner against the contact lug 12 in an electrically contacting manner. The free end of the connector lug element 30 is formed by an abutment 36 which bears against a bearing ridge 38 that is formed by the frame segment 14 and located between the two insulating layers 4. The bearing ridge 38 is supported, firstly, on the respective insulating layer 4 that is disposed opposite to the insulating layer 4 associated with the connector lug element 30. The abutment 36 bears against the bearing ridge 38 opposite to the planar bearing surface of the bearing ridge 38 at the insulating layer 4. Accordingly, the contact projection 34 is fixed into place against the coating 6 of the insulating layer 4 associated with this connector lug element 30. A reliable contact is ensured with this configuration even if the heating cell is overmolded together with the connector lug elements 30. Plastic material expanding when curing and forming the frame 22 cannot impair the electrical contact between the connector lug element 30 and the associated insulating layer.

FIG. 7 illustrates punctiform needle-shaped projections on the support surface of the abutment 36 which penetrate into the bearing ridge 38 in the course of the assembly and thus ensure improved attachment of the two elements FIGS. 4 and 5 further illustrate a labyrinth seal 26 which fully circumferentially surrounds the entire frame segment 14 and thus seals the frame 22 entirely in a female plug receptacle of the partition wall.

We claim:

1. A PTC heating element comprising: two insulating layers with a metallic coating provided on one side of each of said insulating layers and a PTC element arranged therebetween which is provided on oppositely disposed main side surfaces thereof with a respective metallization which is electrically conductively connected to said metallic coating of one of said insulating layers, wherein the metallization on one of said main side surfaces is assigned only to one potential for energizing said PTC element, wherein the metallization provided on the other of said main side surfaces is only assigned to the other potential for energizing said PTC element, wherein each of said insulating layers is glued to said PTC element, and wherein said metallic coating of said insulating layers is in direct electrically conductive contact with said metallization of said PTC element.

2. The PTC heating element according to claim 1, wherein said metallic coating and said metallization of said PTC element are bonded with adhesive that conducts heat well.

3. The PTC heating element according to claim 2, wherein a filler material containing adhesive is provided between said metallic coating and said metallization, and wherein said filler material has a maximum grain size of 20 µm.

4. The PTC heating element according to claim 1, wherein a contact lug is formed by one of said insulating layers and projects over said PTC heating element.

5. The PTC heating element according to claim 4, wherein said contact lug is passed in a sealed manner through a frame which seals said insulating layers on an edge side of said insulating layers.

6. The PTC heating element according to claim 4, wherein said contact lug terminates within a frame which seals said insulating layers on the edge side of said insulating layers, and which is contacted by a connector lug element that projects over said frame at an end side of said frame.

7. The PTC heating element according to claim 6, wherein said connector lug element bears against the assigned insulating layer in a preloaded manner.

8. The PTC heating element according to claim 6, wherein a frame segment, which forms holding channels for said contact lug or said connector lug elements, respectively, is pushed onto said insulating layers.

9. The PTC heating element according to claim 8, wherein said frame segment is sealed into said frame by injection mold coating.

10. The PTC heating element according to claim 8, wherein each of said connector lug elements is held in a positive-fit manner in said frame segment.

11. The PTC heating element according to claim 6, wherein said connector lug elements is formed by a punch-processed piece of sheet metal which forms a contact projection against the metallic coating of one insulating layer and adjacent hereto a bearing ridge against another oppositely disposed insulating layer, the bearing ridge being formed by the frame segment and being disposed between said insulating layers.

12. The PTC heating element according to claim 1, wherein any of said metallization, said metallic coating, and said adhesive is applied by way of a screen printing process.

13. The PTC heating element according to claim 1, wherein any of said metallization, said metallic coating, and said adhesive is applied by way of sputtering.

14. The PTC heating element according to claim 1, wherein said PTC element is roughened in the region said metallization.

15. Electric heating device for a motor vehicle, comprising:
a housing defining inlet and outlet openings in which several PTC heating elements are arranged, wherein
each PTC heating element includes two insulating layers with a metallic coating provided on one side of each of said insulting layers and a PTC element arranged therebetween which is provided on oppositely disposed main side surfaces thereof with a respective metallization which is electrically conductively connected to said metallic coating of one of said insulating layers, wherein the metallization on one of said main side surfaces is assigned only to one potential for energizing said PTC element, and wherein the metallization provided on the other of said main side surfaces is only assigned to the other potential for energizing said PTC element wherein, each of said insulating layers is glued to said PTC element, and said metallic coating of said insulating layers is in direct electrically conductive contact with said metallization of said PTC element; and
wherein an outer surface facing away from each of said PTC elements is exposed in said housing as an exposed surface for transferring heat to the medium to be heated or is at least in part in heat-conductive contact with a radiator element against which said medium to be heated flows.

\* \* \* \* \*